US012482621B2

(12) United States Patent
Zhong et al.

(10) Patent No.: US 12,482,621 B2
(45) Date of Patent: Nov. 25, 2025

(54) CONNECTING STRUCTURE BETWEEN LEAD-OUT PINS OF AUXILIARY STATIONARY CONTACTS AND YOKE PLATE OF DC RELAY

(71) Applicant: Xiamen Hongfa Electric Power Controls Co., Ltd., Xiamen (CN)

(72) Inventors: Shuming Zhong, Xiamen (CN); Zhuxiong Wu, Xiamen (CN); Yaosheng Hong, Xiamen (CN); Wenguang Dai, Xiamen (CN); Songsheng Chen, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 18 days.

(21) Appl. No.: 17/925,814

(22) PCT Filed: Mar. 22, 2021

(86) PCT No.: PCT/IB2021/052353
§ 371 (c)(1),
(2) Date: Nov. 16, 2022

(87) PCT Pub. No.: WO2021/255531
PCT Pub. Date: Dec. 23, 2021

(65) Prior Publication Data

US 2023/0178319 A1 Jun. 8, 2023

(30) Foreign Application Priority Data

Jun. 17, 2020 (CN) ......................... 202021128091.4
Oct. 23, 2020 (CN) ......................... 202022396630.9

(51) Int. Cl.
*H01H 50/14* (2006.01)
*H01H 50/02* (2006.01)
(Continued)

(52) U.S. Cl.
CPC ............ *H01H 50/14* (2013.01); *H01H 50/02* (2013.01); *H01H 50/36* (2013.01); *H01H 50/541* (2013.01); *H01H 50/546* (2013.01)

(58) Field of Classification Search
CPC ........ H01H 50/14; H01H 50/02; H01H 50/36; H01H 50/541; H01H 50/546; H01H 1/20;
(Continued)

(56) References Cited

U.S. PATENT DOCUMENTS 2,775,666 A 12/1956 Lazich
3,430,165 A * 2/1969 Mussbach .............. H01H 50/20 335/131
(Continued)

FOREIGN PATENT DOCUMENTS

CN 108 597 955 A 9/2018
EP 0 954 045 A2 11/1999
GB 638 037 A 5/1950

OTHER PUBLICATIONS

International Search Report mailed Jul. 23, 2021, in connection to International Application No. PCT/IB2021/052353.
(Continued)

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

A connecting structure between lead-out pins of auxiliary stationary contacts and a yoke plate of a DC relay, includes a yoke plate and a plurality of auxiliary stationary contact lead-out terminal assemblies mounted on the yoke plate; each auxiliary stationary contact lead-out terminal assembly includes a lead-out pins, a glass material body and a kovar alloy part; the lead-out terminal, the glass material body and the kovar alloy part are connected into a whole by sintering,
(Continued)

B-B and the lead-out terminal and the kovar alloy part are insulated from each other by glass material; the auxiliary stationary contact lead-out terminal assembly is welded and fixed to the yoke plate through the kovar alloy part.

9 Claims, 22 Drawing Sheets

(51) Int. Cl.
*H01H 50/36* (2006.01)
*H01H 50/54* (2006.01)

(58) Field of Classification Search
CPC ...... H01H 1/66; H01H 50/023; H01H 50/045; H01H 50/20; H01H 51/065; H01H 51/28; H01H 2050/025
USPC .......................................................... 335/196
See application file for complete search history.

(56) References Cited

U.S. PATENT DOCUMENTS

| | | | | | |
|---|---|---|---|---|---|
| 3,891,950 | A * | 6/1975 | De Lucia | H01H 50/54 | 335/154 |
| RE29,174 | E * | 4/1977 | DeLucia | H01H 50/54 | 335/154 |
| 10,269,517 | B2 | 4/2019 | Ozaki et al. | | |
| 2022/0208494 | A1* | 6/2022 | Yoo | H01H 50/18 | |
| 2023/0335363 | A1* | 10/2023 | Yoo | H01H 50/18 | |
| 2023/0395347 | A1* | 12/2023 | Zhong | H01H 50/541 | |

OTHER PUBLICATIONS

Austria office action dated Mar. 31, 2025, in connection with Austria Application No. GM9005/2021, with English translation thereof.

* cited by examiner

B-B

K-K

L-L

CONNECTING STRUCTURE BETWEEN LEAD-OUT PINS OF AUXILIARY STATIONARY CONTACTS AND YOKE PLATE OF DC RELAY

CROSS-REFERENCE TO RELATED APPLICATIONS

The present disclosure is a national stage filing under 35 U.S.C. § 371 of international PCT application PCT/IB2021/052353, filed Mar. 22, 2021, which claims the benefit of Chinese patent application No. 202021128091.4, titled “Connecting structure between lead-out pins of auxiliary stationary contacts and yoke plate of DC relay”, filed on Jun. 17, 2020, and to Chinese Patent Application No. 202022396630.9, titled “Connecting structure between auxiliary stationary contacts and yoke plate of high-voltage DC relay”, filed on Oct. 23, 2020, each of these applications is herein incorporated by reference in its entirety.

TECHNICAL FIELD

The present disclosure relates to the technical field of relays, and in particular to a connecting structure between lead-out pins of auxiliary stationary contacts and a yoke plate of a DC relay.

BACKGROUND

A type of DC (Direct Current) relay in the related art adopts a structure with a direct-acting movable spring (also called a direct-acting solenoid), the contact part of this DC relay includes two stationary contacts (that is, the load terminal) and a movable assembly, the movable assembly includes a movable spring part and a pushing rod assembly. The movable spring part is composed of a movable spring and the movable contacts at both ends of the movable spring, the movable spring is a direct-acting type, when the movable contacts at both ends of the movable spring respectively contact the two stationary contacts, the current flows in from one of the stationary contacts, and flows out from the other stationary contacts after passing through the movable spring. A DC relay in the related art requires a normally closed auxiliary contact, in order to realize the function of the normally closed auxiliary contact, this kind of DC relay is to assemble the lead-out pins of the normally closed auxiliary contact on the yoke plate, the auxiliary movable spring is assembled in the pushing rod assembly, when the pushing rod assembly is not moving (that is, in a reset state), the main movable spring is separated from the main stationary contacts, the auxiliary movable spring is connected between the lead-out pins of the two normally closed auxiliary contacts, when the pushing rod assembly moves, the main movable spring is in contact with the main stationary contacts, and the auxiliary movable spring is separated from the lead-out pins of the two normally closed auxiliary contacts. The connecting structure between lead-out pins of auxiliary stationary contacts and a yoke plate of a DC relay of the related art mainly has the disadvantages of complex structure, large volume (occupying a large space in the height direction of the relay), and difficulty in manufacturing (the process is difficult).

SUMMARY

One object of the present disclosure is to overcome the defects in the related art and provide a connecting structure between lead-out pins of auxiliary stationary contacts and a yoke plate of a DC relay, through the improvement of the structure, on one hand, the volume of the product (shrink the space in the height direction) can be reduced, and contribute to the miniaturization of the product; on the other hand, the connecting structure has the characteristics of simple structure and low process difficulty.

Another object of the present disclosure is to overcome the defects in the related art and provide a connecting structure between lead-out pins of auxiliary stationary contacts of a DC relay and a yoke plate, through the improvement of the structure, the structure has the characteristics of simplified structural parts, simple molding, low parts cost, and being able to effectively utilize the space in the thickness direction of the yoke plate, achieving the smallest height occupation, and being beneficial to miniaturization.

According to one aspect of the present disclosure, a connecting structure between lead-out pins of auxiliary stationary contacts and a yoke plate of a DC relay is provided, the connecting structure includes a yoke plate and an auxiliary stationary contact lead-out pin assembly mounted on the yoke plate; the auxiliary stationary contact lead-out pin assembly includes a lead-out pin, a glass material body and a kovar alloy part; the lead-out pin, the glass material body and the kovar alloy part are connected into a whole by sintering, and the lead-out pin and the kovar alloy part are insulated from each other by glass material; the auxiliary stationary contact lead-out pin assembly is welded and fixed to the yoke plate through the kovar alloy part.

According to an exemplary embodiment of the present disclosure, the glass material body is substantially cylindrical, and the lead-out pin is embedded at a center of the glass material body; the kovar alloy part is annular, and the kovar alloy part is wrapped around a peripheral surface of the glass material body, and a height of the glass material body is substantially the same as a height of the kovar alloy part.

According to an exemplary embodiment of the present disclosure, the kovar alloy part comprises an annular vertical piece and an annular horizontal piece; and an inner end of the annular horizontal piece is integrally connected with a bottom end of the annular vertical piece; the annular vertical piece of the kovar alloy part is wrapped around the peripheral surface of the glass material body.

According to an exemplary embodiment of the present disclosure, an integrally connected position of the inner end of the annular horizontal piece and the bottom end of the annular vertical piece is designed as an arc-shaped transition.

According to an exemplary embodiment of the present disclosure, the yoke plate is provided with a through hole for installing the auxiliary stationary contact lead-out pin assembly, a lower part of the through hole is also provided with a step having a step surface facing down, and an outer peripheral surface of the annular vertical piece of the kovar alloy part is cooperatively arranged in the through hole of the yoke plate, an upper surface of the annular horizontal piece of the kovar alloy part is in contact with the step surface of the step of the yoke plate and is fixed by soldering.

According to an exemplary embodiment of the present disclosure, a preset gap is further provided between the outer peripheral surface of the annular vertical piece of the kovar alloy part and an inner wall of the through hole of the yoke plate.

According to an exemplary embodiment of the present disclosure, a bottom surface of the annular horizontal piece of the kovar alloy part is substantially flush with a bottom surface of the yoke plate.

According to an exemplary embodiment of the present disclosure, an upper end of the annular vertical piece of the kovar alloy part is lower than an upper surface of the yoke plate or flush with the upper surface of the yoke plate.

According to an exemplary embodiment of the present disclosure, the lead-out pin comprises a first pin used to cooperate with an auxiliary movable spring of the DC relay and a second pin used to lead outward, the first pin is arranged vertically, the second pin is arranged horizontally, and a plurality of bending portions are further provided between the first pin and the second pin.

According to another aspect of the present disclosure, a connecting structure between lead-out pins of auxiliary stationary contacts and a yoke plate of a DC relay is provided, the connecting structure includes a yoke plate and an auxiliary stationary contact lead-out pin assembly mounted on the yoke plate, the auxiliary stationary contact lead-out pin assembly includes a lead-out pin of the auxiliary stationary contact, a ceramic ring, a transition copper sheet; the lead-out pin of the auxiliary stationary contact comprising a first pin having a needle-shaped structure; wherein an upper surface of the ceramic ring is provided with a metallized layer, and the first pin having the needle-shaped structure is inserted into a middle through hole of the ceramic ring, the first pin and the metallized layer on the upper surface of the ceramic ring are connected by soldering by means of solder stacking; a lower surface of the ceramic ring is provided with a metallized layer, and the metallized layer on the lower surface of the ceramic ring is connected to the transition copper sheet by soldering, the transition copper sheet and the yoke plate are connected by soldering.

According to an exemplary embodiment of the present disclosure, a protruding platform protruding upward is provided in the middle of the upper surface of the ceramic ring, the middle through hole of the ceramic ring penetrates the upper surface of the protruding platform, the metallized layer on the upper surface of the ceramic ring is provided on an upper surface of the protruding platform; the middle of the lower surface of the ceramic ring is provided with a recess that is recessed upward and contains the middle through hole of the ceramic ring, and the protruding platform corresponds to the recess, the metallized layer on the lower surface of the ceramic ring is terminated at an edge of the recess.

According to an exemplary embodiment of the present disclosure, an upper edge of the middle through hole of the ceramic ring is further provided with a chamfer.

According to an exemplary embodiment of the present disclosure, the transition copper sheet is in a shape of ring, an upper surface of a first portion of the transition copper sheet close to an inner ring edge of the transition copper sheet and the metallized layer of the lower surface of the ceramic ring are connected by soldering; the yoke plate is provided with a through hole, and the first pin, the ceramic ring and the transition copper sheet are installed in the through hole, an upper surface of a second portion of the transition copper sheet close to an outer ring edge of the transition copper sheet and a lower edge of the through hole of the yoke plate are connected by soldering.

According to an exemplary embodiment of the present disclosure, a lower edge of the through hole of the yoke plate is also provided with a first step recessed upward, the first step is provided with a first step surface facing downwards, the upper surface of the second portion of the transition copper sheet close to the outer ring edge thereof and the first step surface of the lower edge of the through hole of the yoke plate are connected by soldering.

According to an exemplary embodiment of the present disclosure, a height of the first step recessed upward of the lower edge of the through hole of the yoke plate is greater than or equal to a thickness of the transition copper sheet.

According to an exemplary embodiment of the present disclosure, an upper edge of the through hole of the yoke plate is further provided with a second step recessed downward, the second step is provided with a second step surface facing upwards, after the second portion of the transition copper sheet close to the outer ring edge of the transition copper sheet is bent upward, a lower surface of the second portion of the transition copper sheet close to the outer ring edge of the transition copper sheet and a second step surface of the upper edge of the through hole of the yoke plate are connected by soldering.

According to an exemplary embodiment of the present disclosure, a height of the second step recessed downward of the upper edge of the through hole of the yoke plate is greater than or equal to a thickness of the transition copper sheet.

According to an exemplary embodiment of the present disclosure, the upper surface of the ceramic ring is slightly higher than an upper surface of the yoke plate.

The disclosure will be further described in detail below in conjunction with the drawings and embodiments. However, the connecting structure between lead-out pins of an auxiliary stationary contacts and a yoke plate of a DC relay of the present disclosure not limited to the embodiment.

DETAILED DESCRIPTION

The First Embodiment

Figure 1:
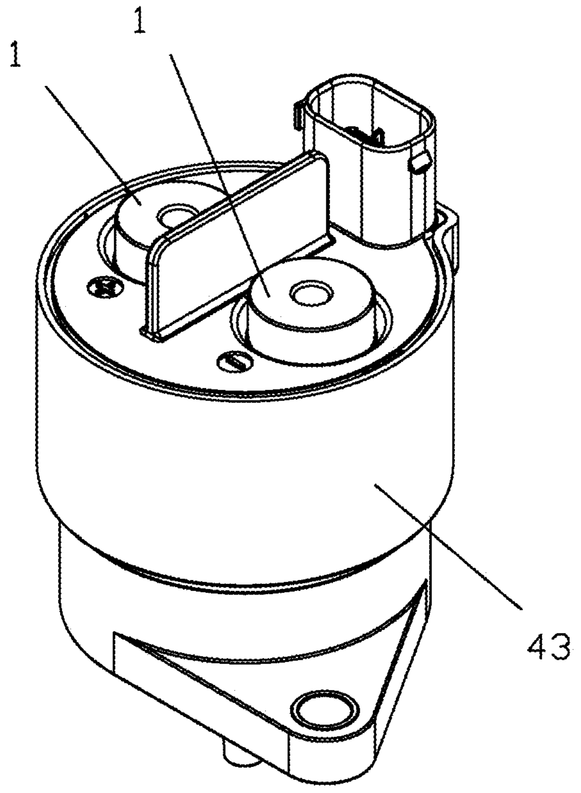
FIG. 1 is a perspective schematic diagram showing the structure of a high-voltage DC relay having a connecting structure of the first embodiment of the present disclosure.
Figure 2:
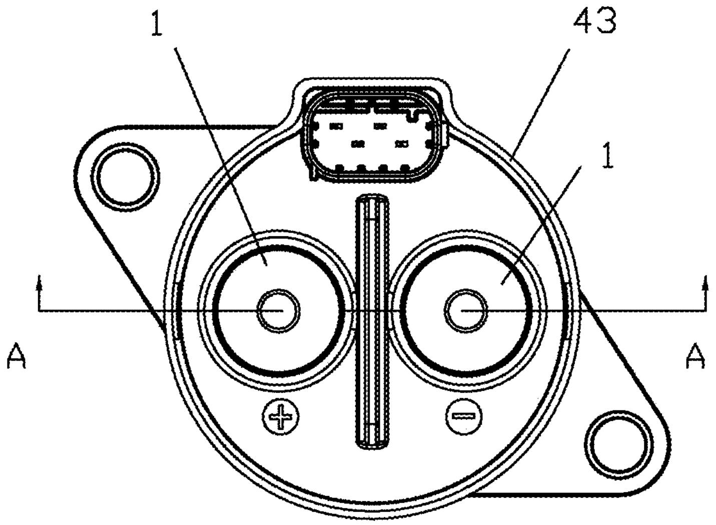
FIG. 2 is a top view of a high-voltage DC relay having the connecting structure of the first embodiment of the present disclosure.
Figure 3:
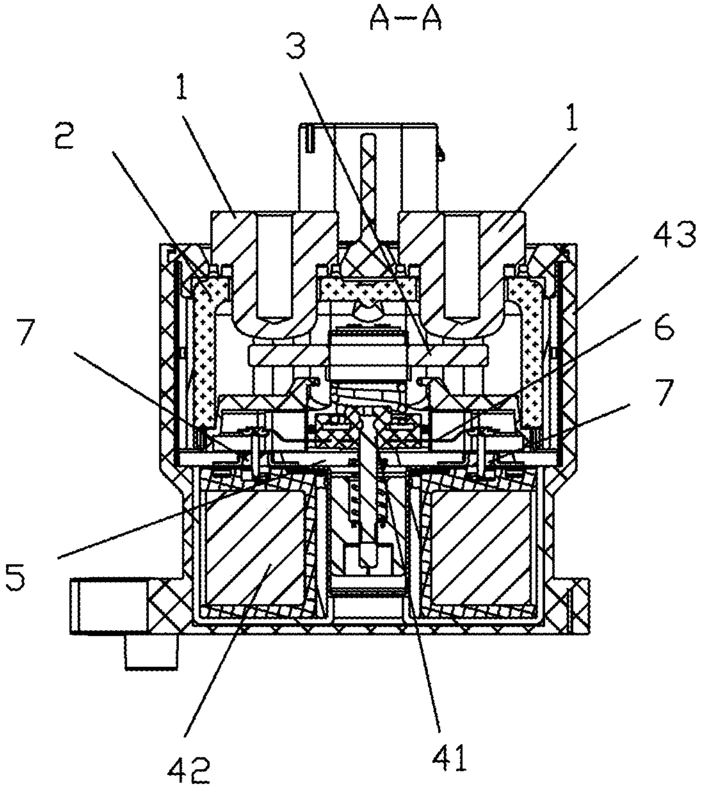
FIG. 3 is a cross-sectional view taken along line A-A in FIG. 2.
Figure 4:
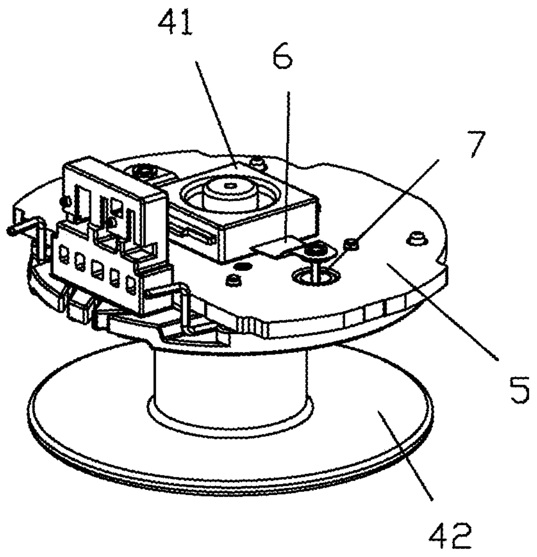
FIG. 4 is a schematic diagram showing a partial structure of the high-voltage DC relay having the connecting structure of the first embodiment of the present disclosure.
Figure 5:
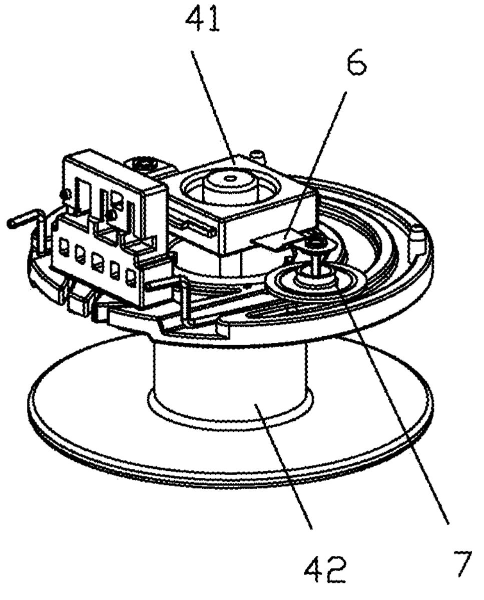
FIG. 5 is a schematic diagram showing a partial structure of the high-voltage DC relay (with the yoke plate removed) having the connecting structure of first embodiment of the present disclosure.
Figure 6:
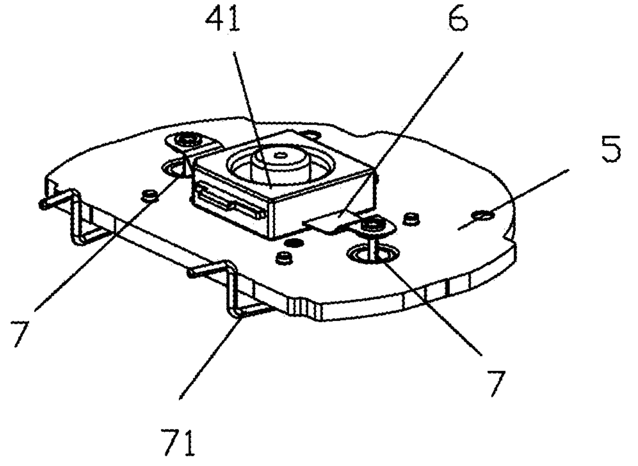
FIG. 6 is an assembly schematic diagram of the pushing rod assembly, the auxiliary stationary contact lead-out pin assemblies, and the auxiliary movable spring of the connecting structure of the first embodiment of the present disclosure.
Figure 7:
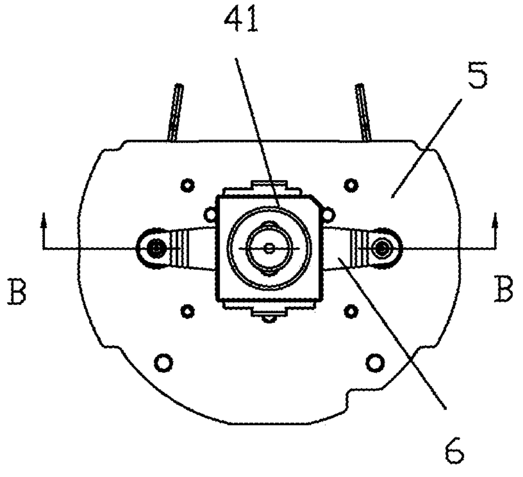
FIG. 7 is a top view of the assembly of the pushing rod assembly and the auxiliary movable spring of the first embodiment of the present disclosure.
Figure 8:
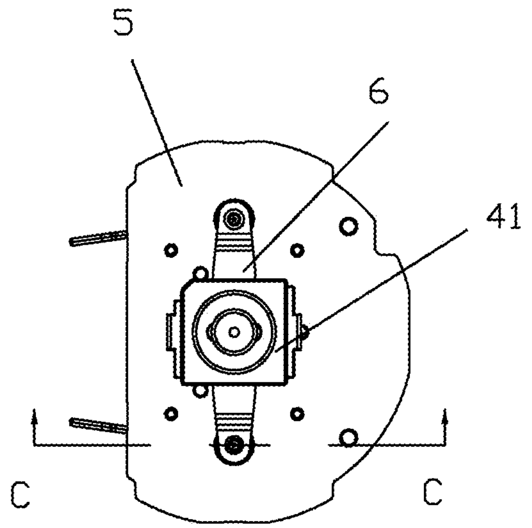
FIG. 8 is a schematic diagram of FIG. 7 after being rotated 90 degrees counterclockwise.
Figure 9:
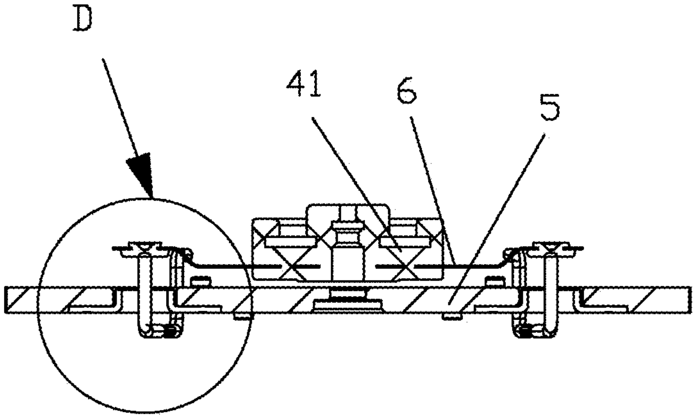
FIG. 9 is a cross-sectional view taken along line B-B in FIG. 7.
Figure 10:
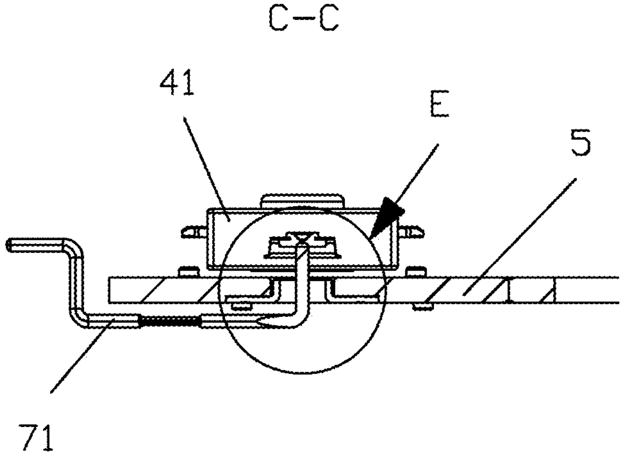
FIG. 10 is a cross-sectional view taken along line C-C in FIG. 8.
Figure 11:
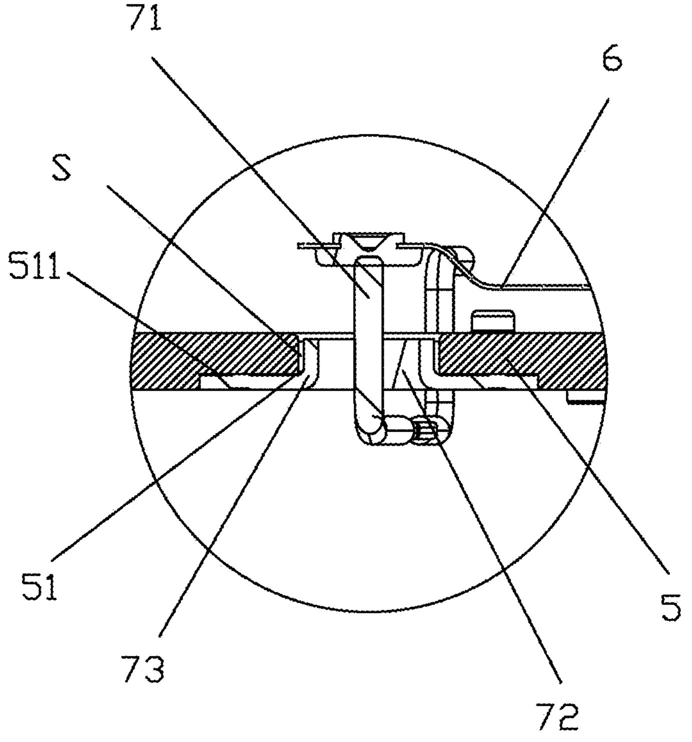
FIG. 11 is an enlarged schematic diagram of part D in FIG. 9.
Figure 12:
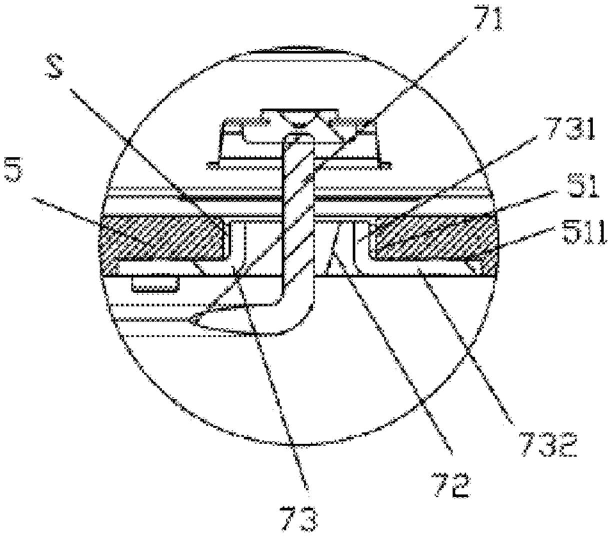
FIG. 12 is an enlarged schematic diagram of part E in FIG. 10.
Figure 13:
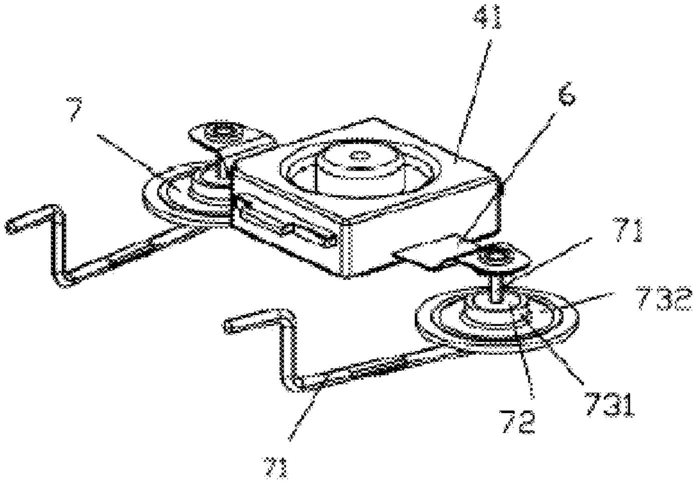
FIG. 13 is an assembly schematic diagram of the auxiliary stationary contact lead-out pin assemblies and the auxiliary movable springs according to the first embodiment of the present disclosure.
Figure 14:
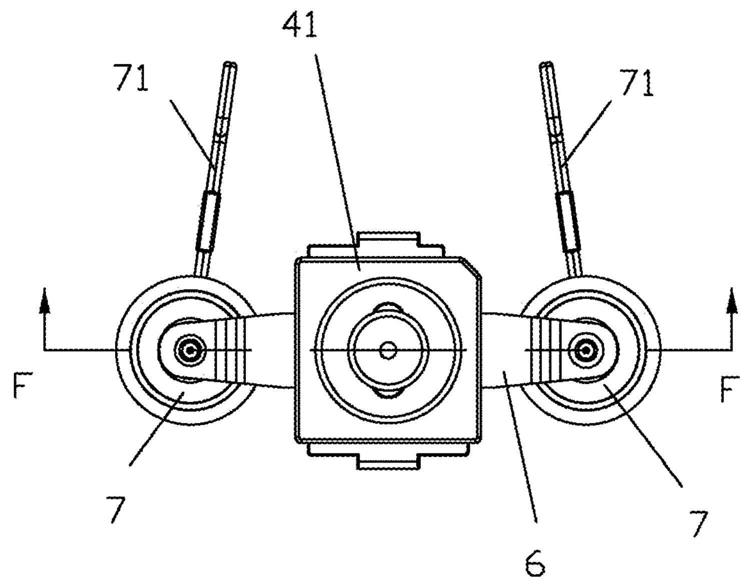
FIG. 14 is a top view of the assembly of the auxiliary stationary contact lead-out pin assemblies and the auxiliary movable springs according to the first embodiment of the present disclosure.
Figure 15:
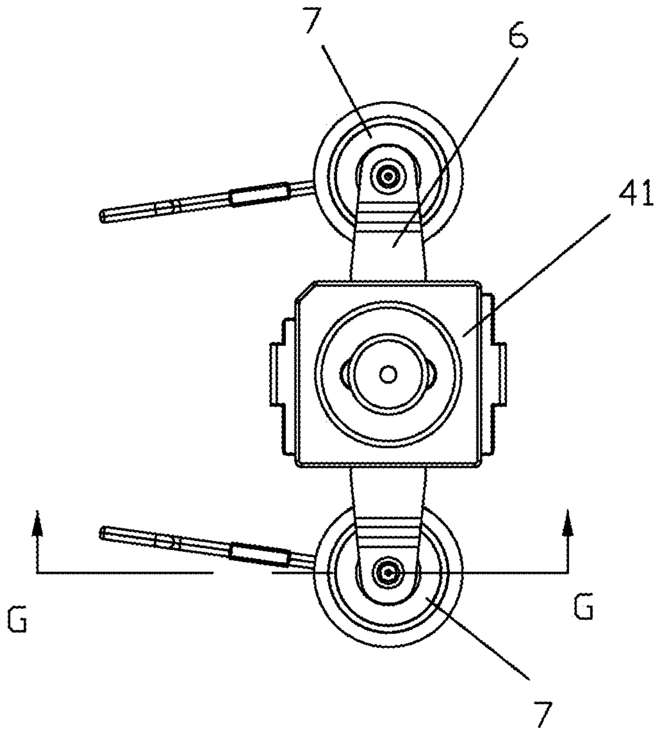
FIG. 15 is a schematic diagram of FIG. 14 after being rotated 90 degrees counterclockwise.
Figure 16:
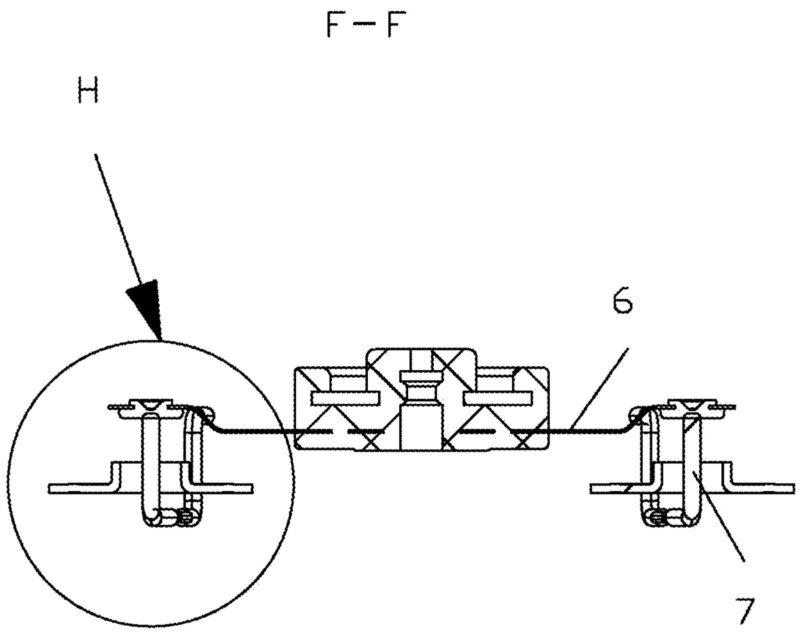
FIG. 16 is a cross-sectional view taken along line F-F in FIG. 14.
Figure 17:
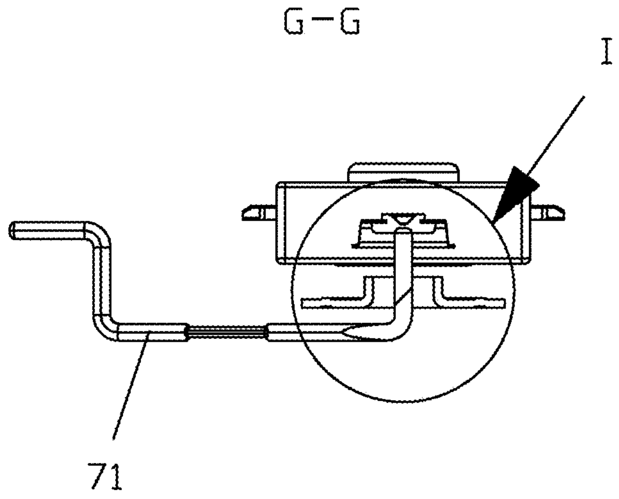
FIG. 17 is a cross-sectional view taken along line G-G in FIG. 15.

Referring to FIGS. 1 to 23, the connecting structure between lead-out pins of auxiliary stationary contacts and a yoke plate of a DC relay of the present disclosure is used on a high-voltage DC relay. As shown in FIGS. 1 to 3, this high-voltage DC relay usually includes two main stationary contacts 1, a ceramic cover 2, an main movable spring 3, a pushing rod assembly 41, a yoke plate 5, a coil 42 and a housing 43, etc.; The two main stationary contacts 1 are respectively mounted on the top of the ceramic cover 2, and the bottom ends of the two main stationary contacts 1 are in the cavity of the ceramic cover 2 and are cooperated with the two ends of the main movable spring 3 (that is, the two main stationary contacts 1 can contact with or disconnect from the main movable spring 3), the main movable spring 3 is mounted on the top of the pushing rod assembly 41, the yoke plate 5 is mounted under the ceramic cover 2, the coil 42 is located under the yoke plate 5, and the housing 43 is wrapped around the outside of the ceramic cover 2 and the coil 42. As shown in FIGS. 3 to 6, the high-voltage DC relay also includes an auxiliary movable spring 6 which are mounted in the pushing rod assembly 41. The connecting structure between the lead-out pins of auxiliary stationary contacts of the DC relay and a yoke plate includes a yoke plate 5 and an auxiliary stationary contact lead-out pin assembly 7 mounted on the yoke plate 5, in one embodiment, there are two auxiliary stationary contact lead-out pin assemblies. As shown in FIGS. 11 to 13, each auxiliary stationary contact lead-out pin assembly 7 includes a lead-out pin 71, a glass material body 72 and a kovar alloy part 73. The lead-out pin 71, the glass material body 72 and the kovar alloy part 73 are connected into a whole by sintering, and the lead-out pin 71 and the kovar alloy part 73 are insulated from each other by the glass material. The auxiliary stationary contact lead-out pin assembly 7 is welded and fixed to the yoke plate 5 through the kovar alloy part 73.

In this embodiment, as shown in FIG. 13, the glass material body 72 is substantially cylindrical, and the lead-out pin 71 is embedded at the center of the glass material body 72. The kovar alloy part 73 is annular, and the kovar alloy part 73 is wrapped around the peripheral surface of the glass material body 72, and the height of the glass material body 72 is substantially the same as the height of the kovar alloy part 73. During production, the glass material is first sintered through the tooling to form a specific blank glass, and then the blank glass is assembled with the kovar alloy part 73 and the lead-out pin 71 through the tooling and then sintered to form the auxiliary stationary contact lead-out pin assembly 7.

Figure 19:
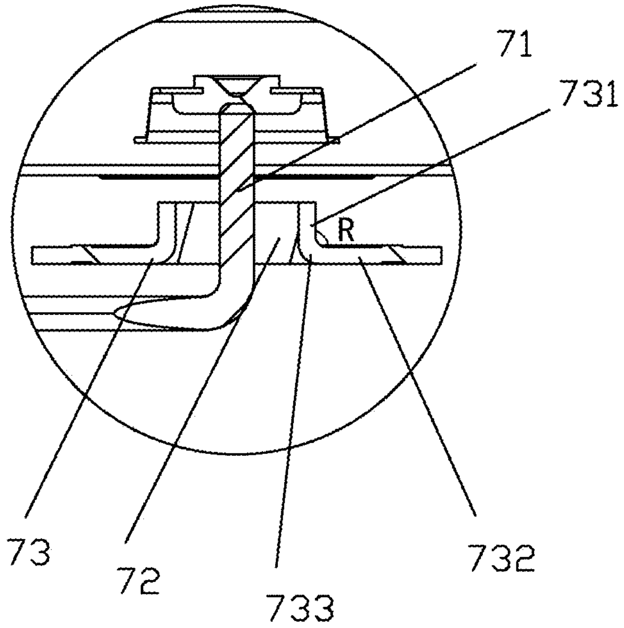
FIG. 19 is an enlarged schematic diagram of part I in FIG. 17.

In this embodiment, as shown in FIGS. 12 and 13, the kovar alloy part 73 includes an annular vertical piece 731 and an annular horizontal piece 732, and the inner end of the annular horizontal piece 732 is integrally connected with the bottom end of the annular vertical piece 731. The annular vertical piece 731 of the kovar alloy part 73 is wrapped around the peripheral surface of the glass material body 72. As shown in FIG. 19, the kovar alloy part 73 can be a metal ring, the center of the metal ring has an upward flanging, that is, the annular vertical piece 731. A mounting hole formed by the flanging is used to install the glass material body 72. The flanging height and the aperture size of the mounting hole determine the reliability of glass sintering, the specific relationship is as follows: the flanging height is proportional to the sealing performance, the higher the flanging height, the better the sealing performance; In the case of ensuring a safe distance, the aperture is inversely proportional to the sealing performance, the larger the aperture, the worse the sealing performance; Since the aperture of the mounting hole and the height of the flanging are inversely proportional, the optimal ratio can be designed.

Figure 18:
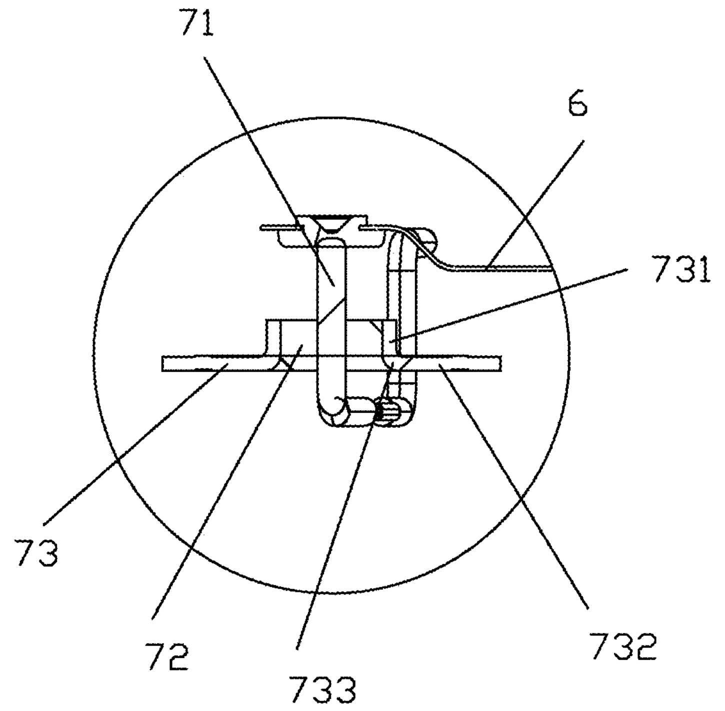
FIG. 18 is an enlarged schematic diagram of part H in FIG. 16.
Figure 22:
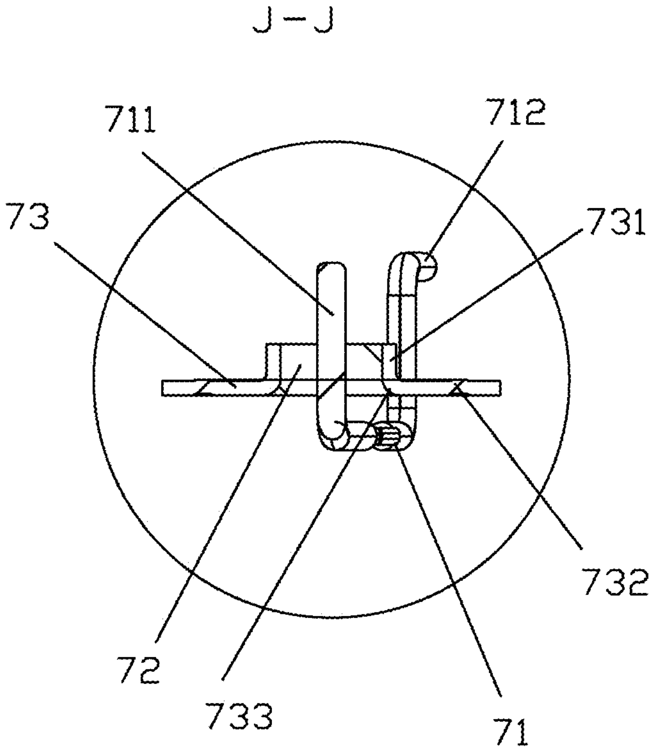
FIG. 22 is a cross-sectional view taken along line J-J in FIG. 21.

In this embodiment, as shown in FIGS. 18 to 19 and FIG. 22, the integrally connected position of the inner end of the annular horizontal piece 732 and the bottom end of the annular vertical piece 731 is designed as an arc-shaped transition 733.

In this embodiment, as shown in FIGS. 11 and 12, the yoke plate 5 is provided with a through hole 51 for installing the auxiliary stationary contact lead-out pin assembly 7, the lower part of the through hole 51 is also provided with a step 511 with a step surface facing down, and the outer peripheral surface of the annular vertical piece 731 of the kovar alloy part 73 is cooperatively arranged in the through hole 51 of the yoke plate 5, the upper surface of the annular horizontal piece 732 of the kovar alloy part 73 is in contact with the step surface of the step 511 of the yoke plate 5, and is fixed by soldering.

In this embodiment, as shown in FIG. 12, a preset gap S is also provided between the outer peripheral surface of the annular vertical piece 731 of the kovar alloy part 73 and the inner wall of the through hole 51 of the yoke plate 5, the gap S is used to provide an expansion space for the kovar alloy part 73 during welding.

In this embodiment, as shown in FIG. 12, the bottom surface of the annular horizontal piece 732 of the kovar alloy part 73 is approximately flush with the bottom surface of the yoke plate 5, that is, the thickness of the annular horizontal piece 732 is equal to the distance from the bottom surface of the yoke plate 5 to the step surface of the step 511, after fixing the annular horizontal piece 732 to the yoke plate 5, the bottom surface of the annular horizontal piece 732 is flush with the bottom surface of the yoke plate 5.

In this embodiment, as shown in FIG. 12, the upper end of the annular vertical piece 731 of the kovar alloy part 73 is lower than the upper surface of the yoke plate 5, of course, it can also be substantially flush with the upper surface of the yoke plate. Because the kovar part 73 and the glass material body 72 do not protrude outside the yoke plate 5, the assembled kovar alloy part 73 and the glass material body 72 will not occupy a size exceeding the height of the yoke plate 5 in the height direction thereof.

Figure 20:
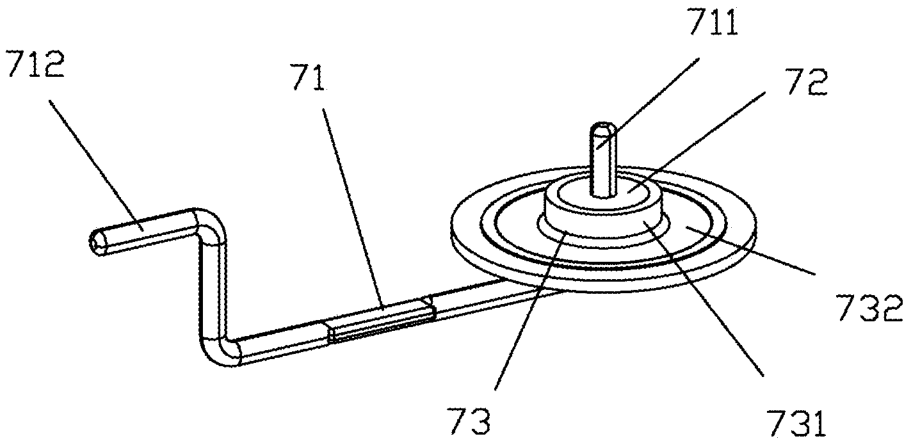
FIG. 20 is a schematic diagram of the auxiliary stationary contact lead-out pin assembly of the first embodiment of the present disclosure.
Figure 21:
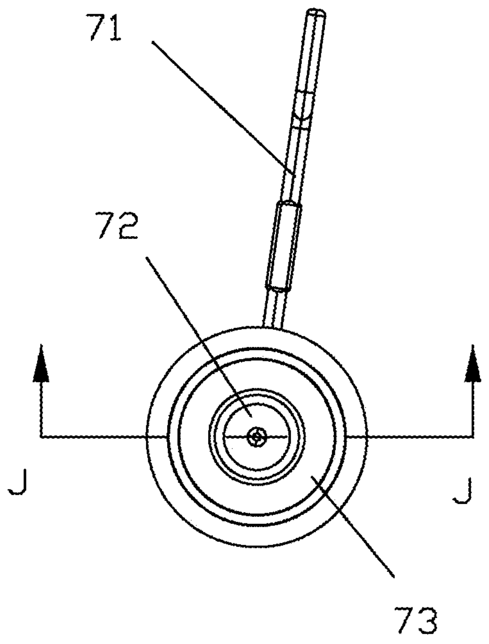
FIG. 21 is a top view of the auxiliary stationary contact lead-out pin assembly of the first embodiment of the present disclosure.
Figure 23:
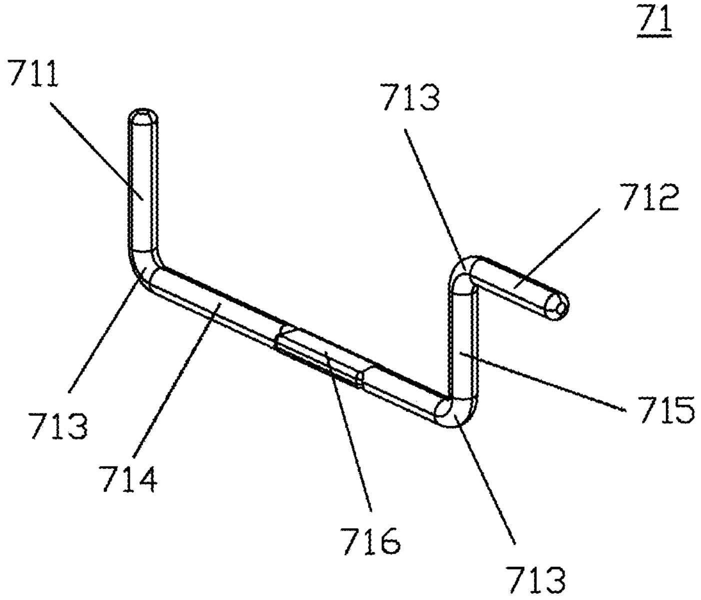
FIG. 23 is a schematic diagram of the structure of the lead-out pin of the auxiliary stationary contact lead-out pin assembly of the first embodiment of the present disclosure.
Figure 24:
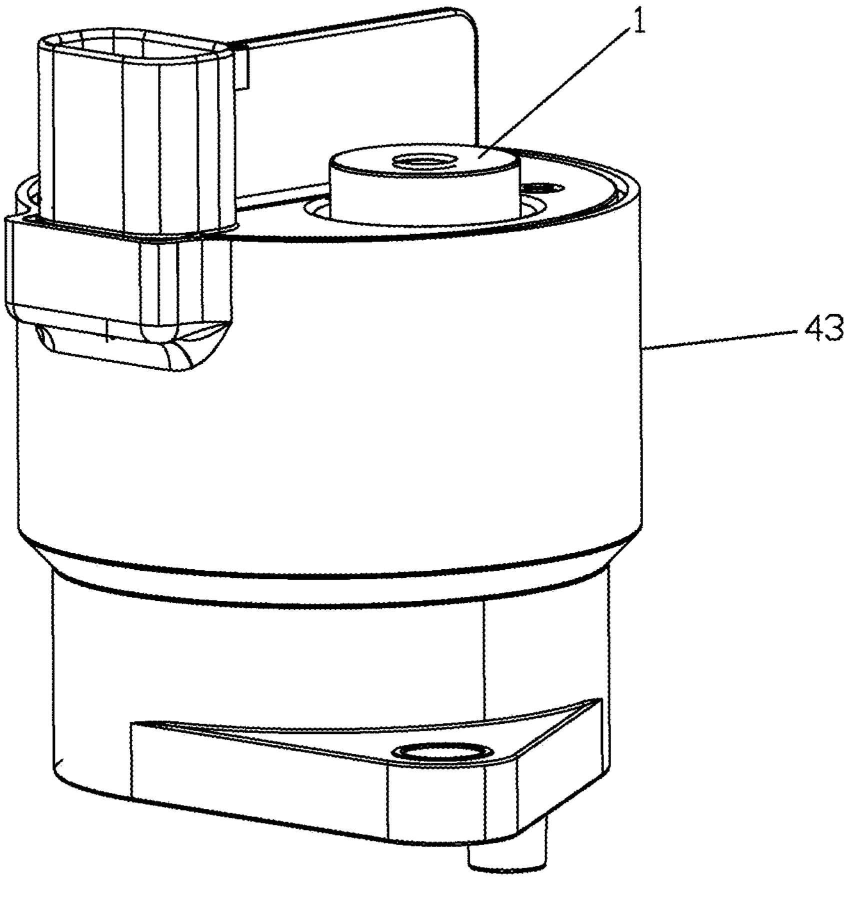
FIG. 24 is a perspective schematic diagram showing the structure of a high-voltage DC relay having a connecting structure of the second embodiment of the present disclosure.
Figure 25:
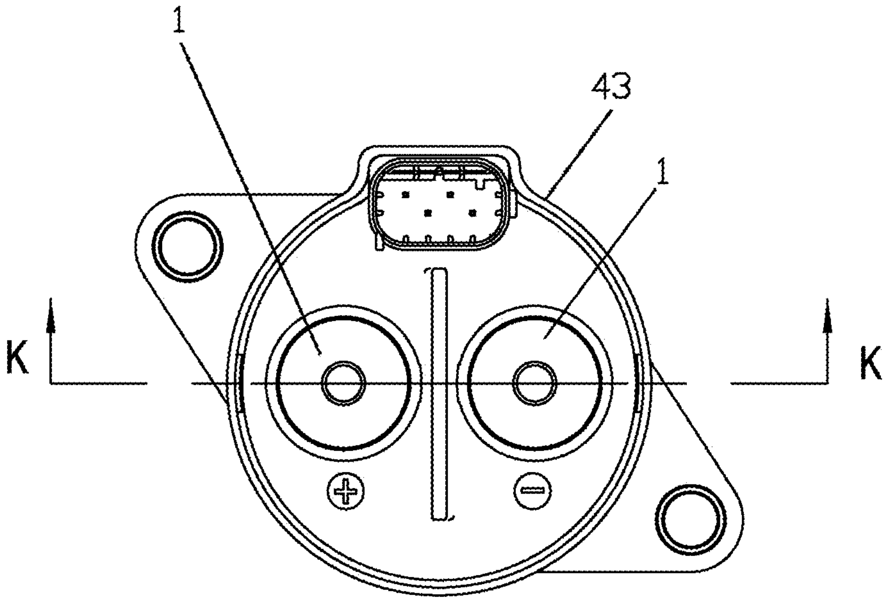
FIG. 25 is a top view of a high-voltage DC relay having the connecting structure of the second embodiment of the present disclosure.
Figure 26:
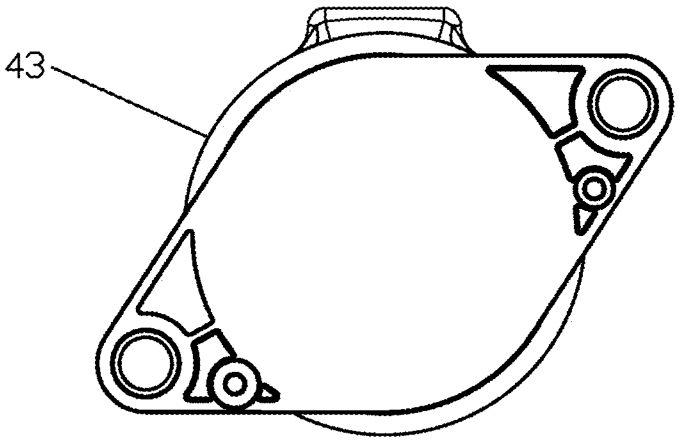
FIG. 26 is a bottom view of a high-voltage DC relay having the connecting structure of the second embodiment of the present disclosure.

In this embodiment, as shown in FIGS. 20 and 22 to 23, the lead-out pin 71 includes a first pin 711 used to cooperate with the auxiliary movable spring 6 and a second pin 712 used to lead outward. The first pin 711 is arranged vertically, the second pin 712 is arranged horizontally, and a plurality of bending portions 713 are further provided between the first pin 711 and the second pin 712, and there are three bending portions 713 in this embodiment.

Specifically, as shown in FIG. 23, the lead-out pin 71 further includes a first connecting portion 714 and a second connecting portion 715, the first connecting portion 714 is arranged horizontally and connected between the bottom end of the first pin 711 and the bottom end of the second connecting portion 715. The second connecting portion 715 is vertically arranged and can be parallel to the first pin 711, the second pin 712 is connected to the top end of the second connecting portion 715 through the transition of a bending portion 713. Continuing to refer to FIG. 23, the first connecting portion 714 is a cylinder, but the first connecting portion 714 is provided with a flat section 716 having a flat surface, the lead-out pin 71 is bent at a position not far from the sintering position (the sintering position is roughly where the first pin 711 is located), for example, the first connecting portion 714 is bent relative to the first pin 711 through the transition of the bending portion 713. Bending treatment can carry out effective stress transfer, that is, when the non-sintered end of the lead-out pin 71 is subjected to an external stress, the stress is transferred to the flat section 716 for release, preventing the external stress from being transmitted to the sintering position and then resulting in poor sintering and sealing.

The connecting structure between the lead-out pins of the auxiliary stationary contacts of the DC relay and the yoke plate of the present disclosure adopts that the lead-out pin 71, the glass material body 72 and the kovar alloy part 73 are used to form the auxiliary stationary contact lead-out pin assembly 7, and the lead-out pin 71, the glass material body 72 and the kovar alloy part 73 are connected into a whole by sintering, and the lead-out pin 71 and the kovar alloy part 73 are insulated from each other by the glass material, the auxiliary stationary contact lead-out pin assembly 7 is welded and fixed to the yoke plate 5 through the kovar alloy part 73. The structure of the present disclosure uses glass material to achieve insulation between the kovar alloy part 73 and the lead-out pin 71, the glass insulator is small in size and can effectively insulate, which can ensure the insulation between the high and low voltages, and realize the safety and reliability of the product. The glass insulator can be sintered with the kovar alloy, the kovar alloy has a small volume (compared to ceramic cover), for example, the thickness can be 0.5 mm, the metal molding process is mature and the production cost is low, it can not only reduce the volume of the product (shrink the space in the height direction), and contribute to the miniaturization of the product, but also has the characteristics of simple structure and low process difficulty.

The connecting structure between the lead-out pins of auxiliary stationary contacts of the DC relay and the yoke plate of the present disclosure adopts that the integrally connected position of the inner end of the annular horizontal piece 732 and the bottom end of the annular vertical piece 731 is designed as an arc-shaped transition 733, thus an inner R angle appears on the outside of the root of the kovar alloy part 73 (as shown in FIG. 19), this inner R angle can effectively reduce the stress concentration generated at the root and ensure welding reliability. The present disclosure also adopts the design of the lead-out pin 71 to include a first pin 711 and a second pin 712, and the first pin 711 is arranged vertically, the second pin 712 is arranged horizontally, and a plurality of bending portions 713 are also provided between the first pin 711 and the second pin 712. In this structure of the present disclosure, the lead-out pin 71 adopts multiple bending structures, which realizes the direct assembly and sealing connection of the auxiliary contact and the printed board assembly, and no intermediate transfer is required. the lead-out pin 71 is bent not far from the sintering position, the bending treatment can carry out effective stress transfer, that is, when the non-sintered end of the lead-out pin 71 is subjected to an external stress, the stress is transferred to the flat section 716 for release, preventing the external stress from being transmitted to the sintering position and then resulting in poor sintering and sealing.

The Second Embodiment

In the related art, a type of high-voltage DC relay adopts a structure with a direct-acting movable spring, that is, the movable spring adopts a bridge-type movable spring to cooperate with the lead-out pins of the two stationary contacts (that is, the bridge-type movable spring can contact with or disconnect from the lead-out pins), in order to realize its main contact monitoring function, this high-voltage DC relay needs to add auxiliary contacts. A high-voltage DC relay in the related art is to install the auxiliary movable contact piece in the pushing rod component and move together with the pushing rod component, the lead-out pins of the auxiliary stationary contacts are mounted on the yoke plate. Because the yoke plate can conduct electricity, the lead-out pins of the auxiliary stationary contacts need to be installed on the yoke plate in an insulated manner. In this high-voltage DC relay, the lead-out pins of the auxiliary stationary contacts are mounted on the yoke plate through ceramic insulation, the connecting structure between the lead-out pins of the auxiliary stationary contacts and the yoke plate of this high-voltage DC relay includes the lead-out pins of the auxiliary stationary contacts, ceramic rings, transition copper rings and a yoke plate, the head part of the lead-out pin of the auxiliary stationary contact is a nail-shaped structure, and a metallized layer is provided on the upper and lower surfaces of the ceramic ring, the nail body part of the lead-out pin of the auxiliary stationary contact is inserted into the ceramic ring, and the nail head part of the lead-out pin of the auxiliary stationary contact is pressed on the ceramic ring, the nail head part of the lead-out pin of the auxiliary stationary contact is welded to the ceramic ring through the metallized layer on the top of the ceramic ring, the bottom of the ceramic ring is welded and fixed with the transition copper ring through the metallized layer, and the transition copper ring is welded and fixed with the yoke plate. However, the applicant found that the connecting structure between the lead-out pins of the auxiliary stationary contacts and the yoke plate of the high-voltage DC relay mainly has the following disadvantages:

1. The molding process of the transition copper ring and the lead-out pin of the auxiliary stationary contact is not good, and the processing cost is high.

2. Limited by the requirements of parts molding, the auxiliary contacts of the product occupy a large space, which is not conducive to the miniaturization of the product.

Figure 27:
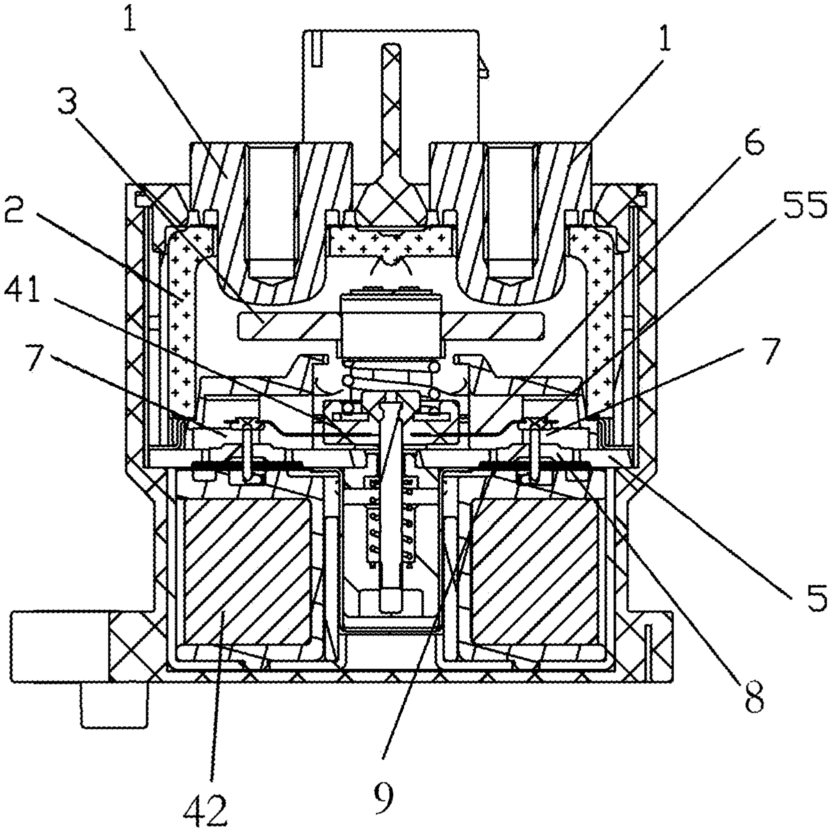
FIG. 27 is a cross-sectional view taken along line K-K in FIG. 25.
Figure 28:
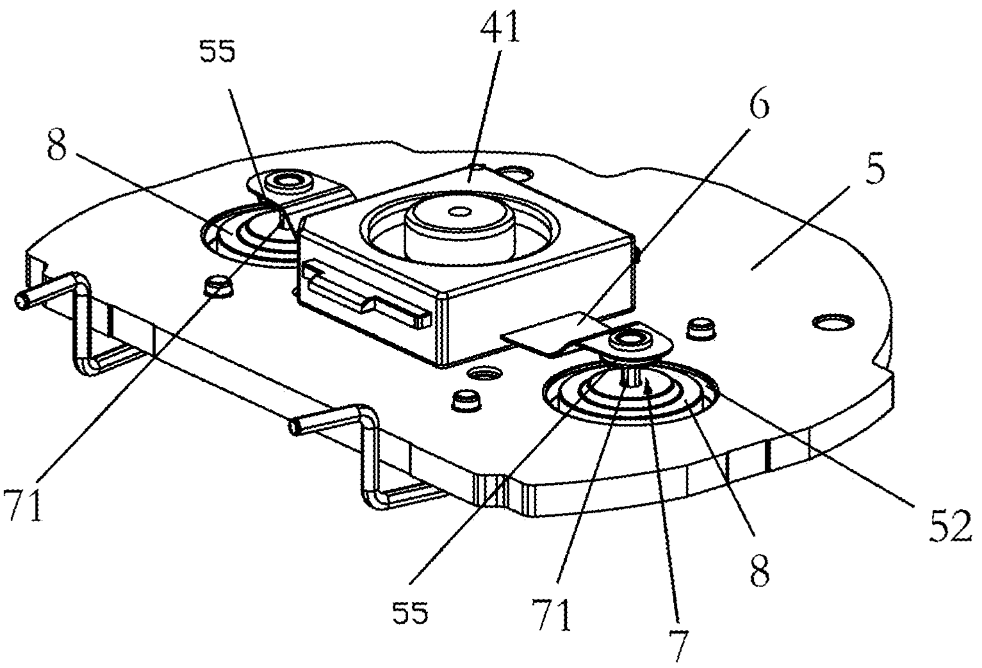
FIG. 28 is a perspective schematic diagram of the connecting structure (including the auxiliary movable springs and the auxiliary movable contacts) of the second embodiment of the present disclosure.
Figure 29:
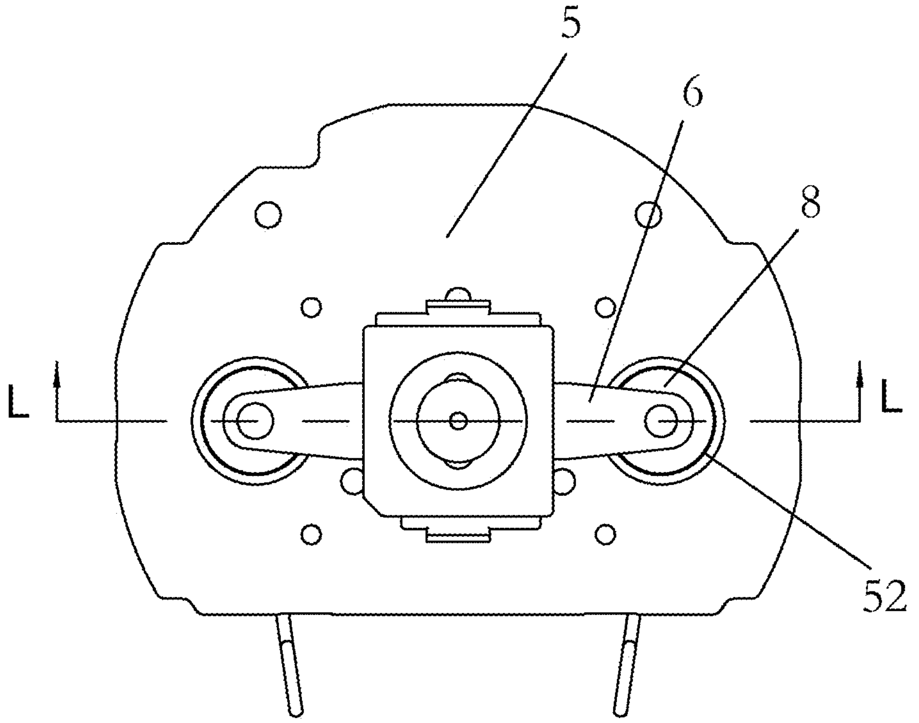
FIG. 29 is a top view of the connecting structure (including the auxiliary movable springs and the auxiliary movable contacts) of the second embodiment of the present disclosure.
Figure 30:
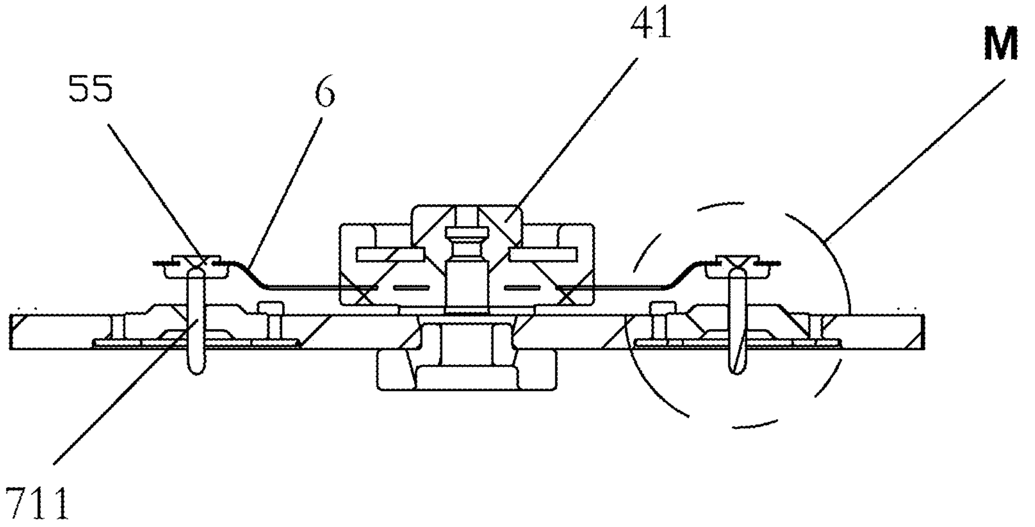
FIG. 30 is a cross-sectional view taken along line L-L in FIG. 29.

Refer to FIGS. 24 to 34, the connecting structure of the lead-out pins of an auxiliary stationary contacts and the yoke plate of the high-voltage DC relay disclosed in the present disclosure is used on the high-voltage DC relay, this high-voltage DC relay usually includes two main stationary contacts 1, a ceramic cover 2, an main movable spring 3, a pushing rod assembly 41, a yoke plate 5, a coil 42 and a housing 43, etc.; The two main stationary contacts 1 are respectively mounted on the top of the ceramic cover 2, and the bottom ends of the two main stationary contacts 1 are in the cavity of the ceramic cover 2 and are cooperated with the two ends of the main movable spring 3, the main movable spring 3 is mounted on the top of the pushing rod assembly 41, the yoke plate 5 is mounted under the ceramic cover 2, the coil 42 is located under the yoke plate 5, and the housing 43 is wrapped around the outside of the ceramic cover 2 and the coil 42. As shown in FIGS. 27 to 28, the high-voltage DC relay also includes an auxiliary movable spring 6 which are mounted in the pushing rod assembly 41.

The connecting structure of the lead-out pins of auxiliary stationary contacts and the yoke plate of the high-voltage DC relay of the present disclosure may include a yoke plate 5 and a an auxiliary stationary contact lead-out pin assembly 7 arranged on the yoke plate 5, in one embodiment, there are two auxiliary stationary contact lead-out pin assemblies 7. Each auxiliary stationary contact lead-out pin assembly 7 may include a lead-out pin 71 of the auxiliary stationary contact, a ceramic ring 8, a transition copper sheet 9 and a yoke plate 5. As shown in FIGS. 24 to 27, the high-voltage DC relay of the present disclosure adopts a structure with a direct-acting movable spring, that is, the movable spring adopts the movable spring 3 to cooperate with the two main stationary contacts 1, the auxiliary movable spring 6 is mounted on the pushing rod assembly 41, and the auxiliary movable contacts 55 are fixed on both ends of the auxiliary movable spring 6, the lead-out pins 71 of the auxiliary stationary contacts and the auxiliary movable contact 55 are assembled correspondingly. The structure of each of the lead-out pins 71 can be the same as that of the first embodiment, and the lead-out pin 71 includes a first pin 711. As shown in FIGS. 28 to 31, the first pin 711 of the lead-out pin 71 of the auxiliary stationary contact has a needle-shaped structure. The upper surface of the ceramic ring 8 is provided with a metallized layer, and the needle-shaped first pin 711 of the lead-out pin 71 is inserted into the middle through hole 81 of the ceramic ring 8. The first pin 711 of the lead-out pin 71 and the metallized layer on the upper surface of the ceramic ring 8 are connected by soldering by means of solder stacking. The lower surface of the ceramic ring 8 is provided with a metallized layer, and the metallized layer on the lower surface of the ceramic ring 8 is connected to the transition copper sheet 9 by soldering, the transition copper sheet 9 and the yoke plate 5 are connected by soldering.

In this embodiment, as shown in FIGS. 31 to 34, a protruding platform 82 protruding upward is provided in the middle of the upper surface of the ceramic ring 8, the middle through hole 81 of the ceramic ring 8 penetrates the upper surface of the protruding platform 82, the metallized layer on the upper surface of the ceramic ring 8 is provided on the upper surface of the protruding platform 82. The middle of the lower surface of the ceramic ring 8 is provided with a recess 83 that is recessed upward and contains the middle through hole 81 of the ceramic ring 8, and the protruding platform 82 corresponds to the recess 83, that is, the shape of the cross-sectional profile of the protruding platform 82 and the recess 83 is the same, and the recess 83 is located directly below the protruding platform 82. The metallized layer on the lower surface of the ceramic ring 8 is terminated at the edge of the recess 83, that is, there is no metallized layer in the recess 83 of the ceramic ring 8.

Figure 34:
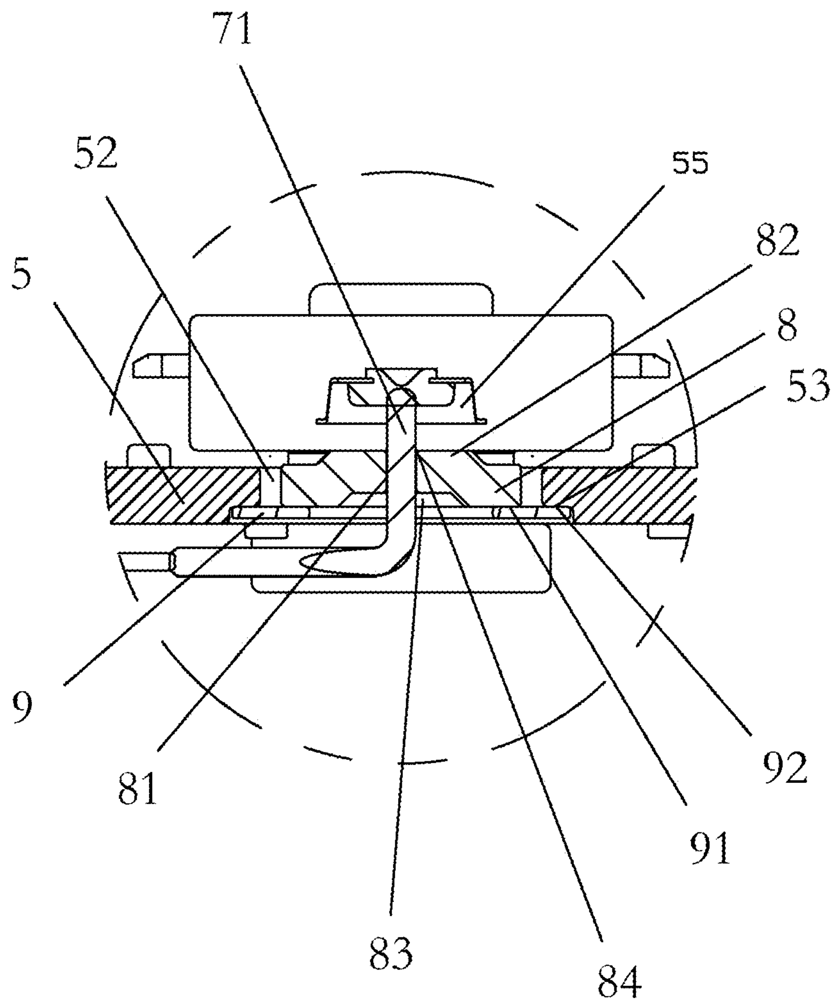
FIG. 34 is an enlarged schematic diagram of part O in FIG. 33.

In this embodiment, as shown in FIG. 34, the upper edge of the middle through hole 81 of the ceramic ring 8 is further provided with a chamfer 84.

Figure 31:
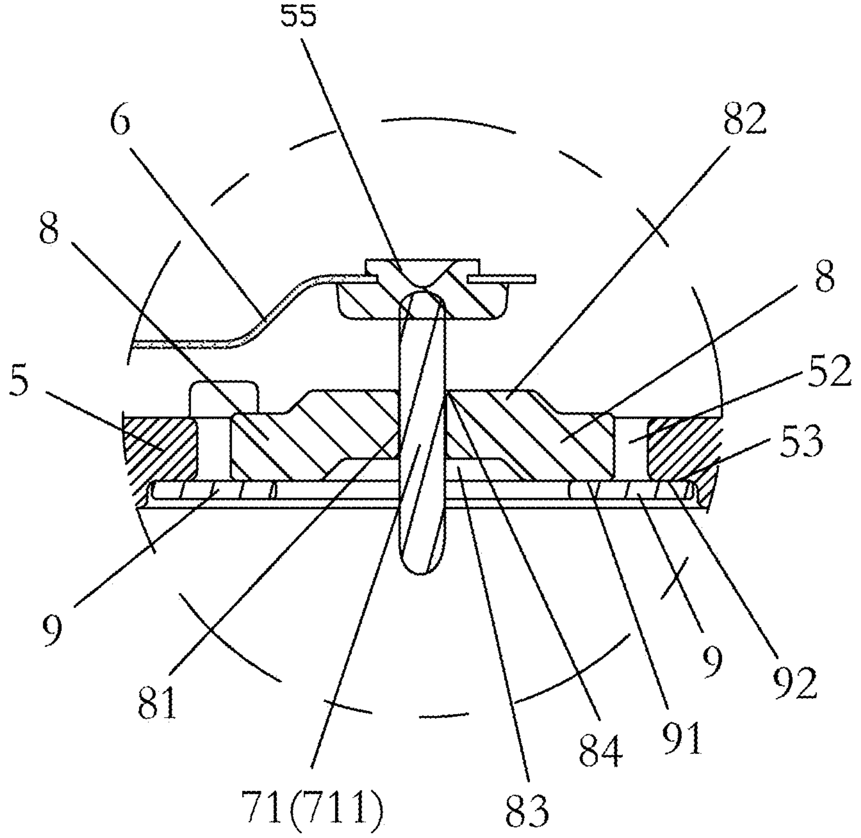
FIG. 31 is an enlarged schematic diagram of part M in FIG. 30.
Figure 32:
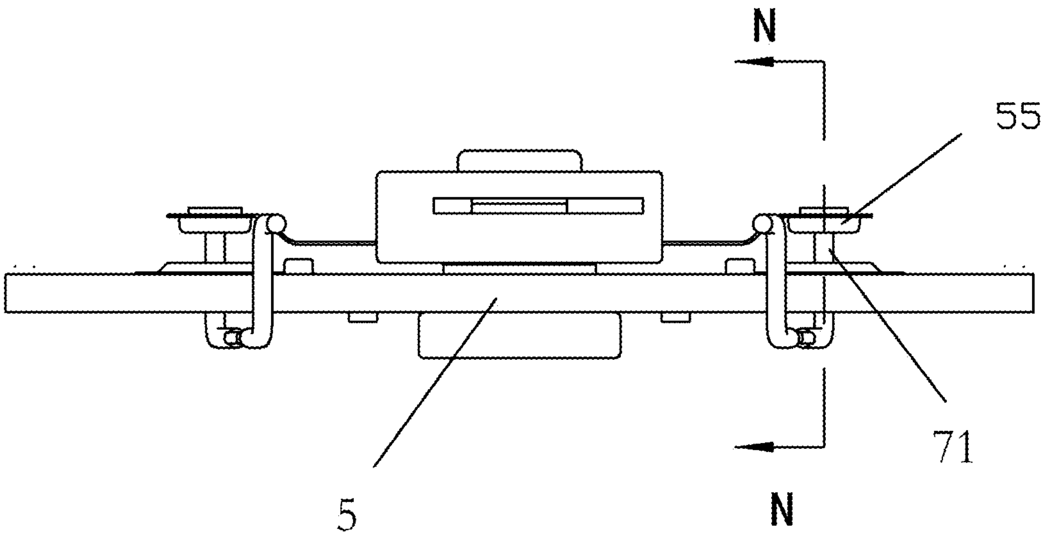
FIG. 32 is a front view of the connecting structure (including the auxiliary movable springs and the auxiliary movable contacts) of the second embodiment of the present disclosure.
Figure 33:
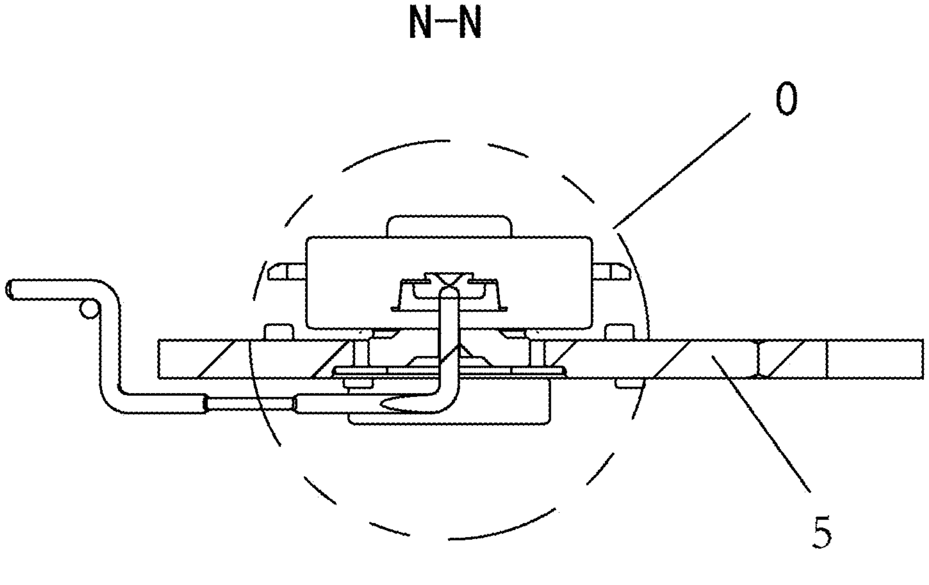
FIG. 33 is a cross-sectional view taken along line N-N in FIG. 32.

In this embodiment, the transition copper sheet 9 is in a shape of ring, as shown in FIG. 31, the upper surface of the first portion 91 of the transition copper sheet 9 close to the inner ring edge thereof and the metallized layer of the lower surface of the ceramic ring 8 are connected by soldering. As shown in FIGS. 31 and 34, the yoke plate 5 is provided with a through hole 52, and the first pin 711 of the lead-out pin 71 of the auxiliary stationary contact, the ceramic ring 8 and the transition copper sheet 9 are installed in the through hole 52. The upper surface of the second portion 92 of the transition copper sheet 9 close to the outer ring edge thereof and the lower edge of the through hole 52 of the yoke plate 5 are connected by soldering.

In this embodiment, as shown in FIGS. 31 and 34, the lower edge of the through hole 52 of the yoke plate 5 is also provided with a first step recessed upward, the first step has a first step surface 53 facing downwards, the upper surface of the second portion 92 of the transition copper sheet 9 close to the outer ring edge thereof and the first step surface

53 of the lower edge of the through hole 52 of the yoke plate 5 are connected by soldering.

In this embodiment, as shown in FIGS. 31 and 34, the height of the upwardly recessed first step of the lower edge of the through hole 52 of the yoke plate 5 is greater than the thickness of the transition copper sheet 9.

In this embodiment, as shown in FIG. 31 and FIG. 34, the upper surface of the ceramic ring 8 is slightly higher than the upper surface of the yoke plate 5.

The connecting structure of the lead-out pins of an the auxiliary stationary contacts and the yoke plate of the high-voltage DC relay of the present disclosure adopts that the first pin 711 of the lead-out pin 71 is a needle-shaped structure, that is, the first pin 711 of the lead-out pin 71 is relatively thin and small. The upper surface of the ceramic ring 8 is provided with a metallized layer, and the first pin 711 having a needle-shaped structure is inserted into the middle through hole 81 of the ceramic ring 8, the first pin 711 and the metallized layer on the upper surface of the ceramic ring 8 are connected by soldering by means of solder stacking. The lower surface of the ceramic ring 8 is provided with a metallized layer, and the metallized layer on the lower surface of the ceramic ring 8 is connected to the transition copper sheet 9 by soldering, the transition copper sheet 9 and the yoke plate 5 are connected by soldering. The structure of the present disclosure has the characteristics of simplified structural parts, simple molding, low parts cost, and being able to effectively utilize the space in the thickness direction of the yoke plate, achieving the smallest height occupation, and being beneficial to miniaturization.

The connecting structure between the lead-out pins of auxiliary stationary contacts and the yoke plate of the high-voltage DC relay of the present disclosure adopts that a protruding platform 82 protruding upward is provided in the middle of the upper surface of the ceramic ring 8, the middle through hole 81 of the ceramic ring 8 penetrates the upper surface of the protruding platform 82, the metallized layer on the upper surface of the ceramic ring 8 is provided on the upper surface of the protruding platform 82. The middle of the lower surface of the ceramic ring 8 is provided with a recess 83 that is recessed upward and contains the middle through hole 81 of the ceramic ring 8, and the protruding platform 82 corresponds to the recess 83, the metallized layer under the ceramic ring 8 terminates at the edge of the recess 83. In this structure of the present disclosure, the upper surface of the protruding platform 82 is metallized, so that the metallized area is reduced, and because the lower recess is not metallized, the upper and lower surfaces of the ceramic ring are insulated, and the lead-out pins 71 and the yoke plate 5 are effectively insulated.

The connecting structure between the lead-out pins of auxiliary stationary contacts and the yoke plate of the high-voltage DC relay of the present disclosure adopts that the upper edge of the middle through hole 81 of the ceramic ring 8 is further provided with a chamfer 84, on the one hand, the parts are not easy to crack during the molding and grinding process, on the other hand, the chamfer position is conducive to the stacking of solder and increases the soldering strength.

Figure 35:
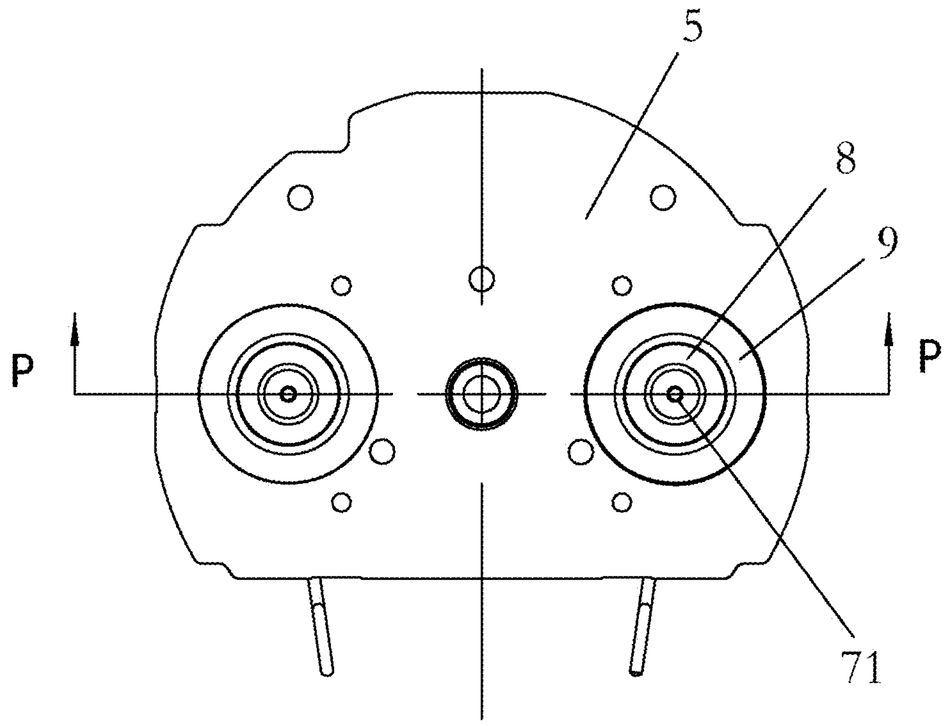
FIG. 35 is a top view of another high-voltage DC relay of the second embodiment of the present disclosure.
Figure 36:
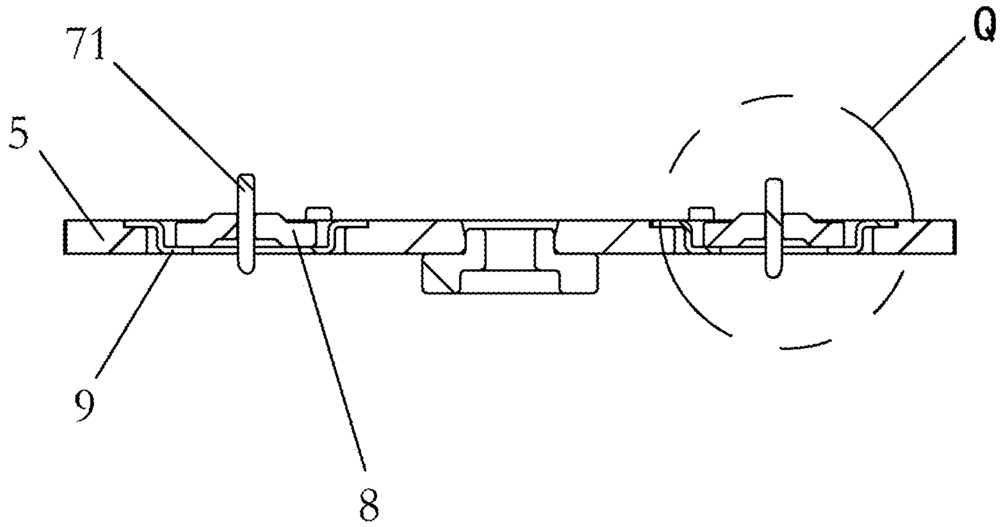
FIG. 36 is a cross-sectional view taken along line P-P in FIG. 35.
Figure 37:
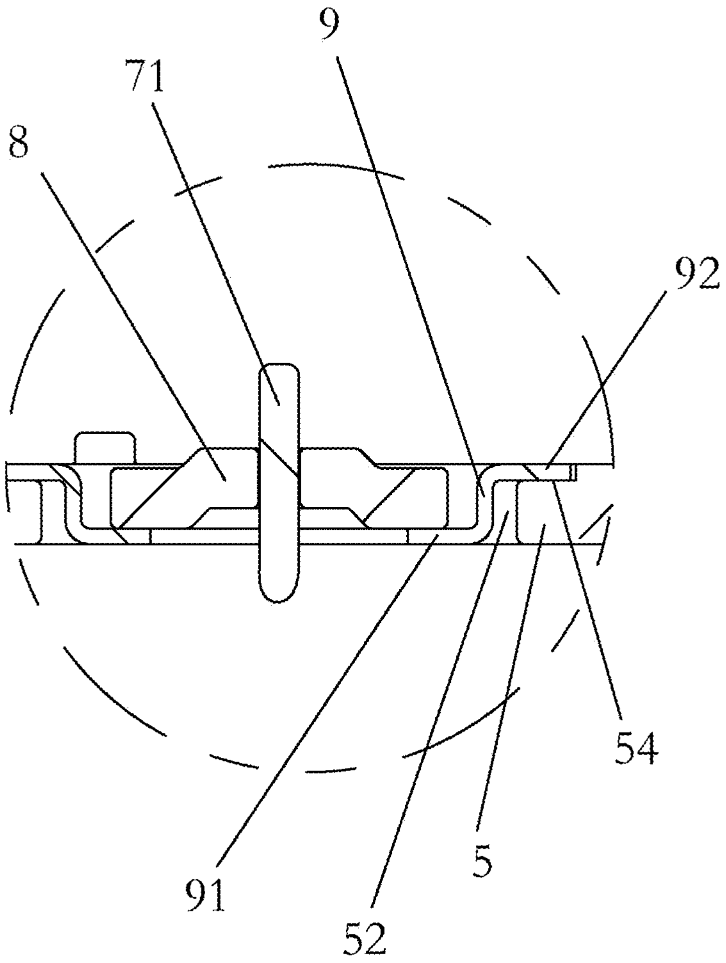
FIG. 37 is an enlarged schematic diagram of part Q in FIG. 36.

Refer to FIGS. 35 to 37, another connecting structure between the lead-out pins of auxiliary stationary contacts and the yoke plate of the high-voltage DC relay of the present disclosure is shown, the difference between this connecting structure and the connecting structure in the above embodiment is that: the upper edge of the through hole 52 of the yoke plate 5 is also provided with a second step recessed downward, and the second step is provided with a second step surface 54 facing upwards, after the second portion 92 of the transition copper sheet 9 close to the outer ring edge thereof is bent upward, the lower surface of the second portion 92 of the transition copper sheet 9 close to the outer ring edge thereof and the second step surface 54 of the upper edge of the through hole 52 of the yoke plate 5 are connected by soldering. The height of the second step recessed downward of the upper edge of the through hole 52 of the yoke plate 5 is equal to the thickness of the transition copper sheet 9.

The above described are only preferred embodiments of the present disclosure, and do not limit the present disclosure in any form. Although the present disclosure has been disclosed as above in preferred embodiments, it is not intended to limit the present disclosure. Any person skilled in the art, without departing from the scope of the technical solutions of the present disclosure, can use the technical content disclosed above to make many possible changes and modifications to the technical solutions of the present disclosure, or modify them into equivalent embodiments. Therefore, any simple modifications, equivalent changes and modifications made to the above embodiments according to the technical essence of the present disclosure without departing from the content of the technical solution of the present disclosure shall fall within the protection scope of the technical solution of the present disclosure.

What is claimed is:

1. A connecting structure between lead-out pins of auxiliary stationary contacts and a yoke plate of a DC relay, comprising a yoke plate and an auxiliary stationary contact lead-out pin assembly mounted on the yoke plate; the auxiliary stationary contact lead-out pin assembly comprising a lead-out pin, a glass material body and an alloy part; wherein the lead-out pin, the glass material body and the alloy part are connected into a whole by sintering, and the lead-out pin and the alloy part are insulated from each other by glass material; the auxiliary stationary contact lead-out pin assembly is welded and fixed to the yoke plate through the alloy part.

2. The connecting structure between lead-out pins of auxiliary stationary contacts and a yoke plate of a DC relay according to claim 1, wherein the glass material body is cylindrical, and the lead-out pin is embedded at a center of the glass material body; the alloy part is annular, and the alloy part is wrapped around a peripheral surface of the glass material body, and a height of the glass material body is the same as a height of the alloy part.

3. The connecting structure between lead-out pins of auxiliary stationary contacts and a yoke plate of a DC relay according to claim 2, wherein the alloy part comprises an annular vertical piece and an annular horizontal piece; and an inner end of the annular horizontal piece is integrally connected with a bottom end of the annular vertical piece; the annular vertical piece of the alloy part is wrapped around the peripheral surface of the glass material body.

4. The connecting structure between lead-out pins of auxiliary stationary contacts and a yoke plate of a DC relay according to claim 3, wherein an integrally connected position of the inner end of the annular horizontal piece and the bottom end of the annular vertical piece is designed as an arc-shaped transition.

5. The connecting structure between lead-out pins of auxiliary stationary contacts and a yoke plate of a DC relay according to claim 3, wherein the yoke plate is provided with a through hole for installing the auxiliary stationary contact lead-out pin assembly, a lower part of the through hole is also provided with a step having a step surface facing down, and an outer peripheral surface of the annular vertical piece of the alloy part is cooperatively arranged in the through hole of the yoke plate, an upper surface of the annular horizontal piece of the alloy part is in contact with the step surface of the step of the yoke plate and is fixed by soldering.

6. The connecting structure between lead-out pins of auxiliary stationary contacts and a yoke plate of a DC relay according to claim 5, wherein a preset gap is further provided between the outer peripheral surface of the annular vertical piece of the alloy part and an inner wall of the through hole of the yoke plate.

7. The connecting structure between lead-out pins of auxiliary stationary contacts and a yoke plate of a DC relay according to claim 5, wherein a bottom surface of the annular horizontal piece of the alloy part is flush with a bottom surface of the yoke plate.

8. The connecting structure between lead-out pins of auxiliary stationary contacts and a yoke plate of a DC relay according to claim 7, wherein an upper end of the annular vertical piece of the alloy part is lower than an upper surface of the yoke plate or flush with the upper surface of the yoke plate.

9. The connecting structure between lead-out pins of auxiliary stationary contacts and a yoke plate of a DC relay according to claim 2, wherein the lead-out pin comprises a first pin used to cooperate with an auxiliary movable spring of the DC relay and a second pin used to lead outward, the first pin is arranged vertically, the second pin is arranged horizontally, and a plurality of bending portions are further provided between the first pin and the second pin.

* * * * *